United States Patent
Kumar et al.

(10) Patent No.: US 10,068,715 B2
(45) Date of Patent: Sep. 4, 2018

(54) ACTIVATED CARBON AND ELECTRIC DOUBLE LAYER CAPACITOR THEREOF

(71) Applicant: Corning Incorporated, Corning, NY (US)

(72) Inventors: Atul Kumar, Horseheads, NY (US); Jia Liu, Painted Post, NY (US); Kamjula Pattabhirami Reddy, Corning, NY (US)

(73) Assignee: Corning Incorporated, Corning, NY (US)

( * ) Notice: Subject to any disclaimer, the term of this patent is extended or adjusted under 35 U.S.C. 154(b) by 197 days.

(21) Appl. No.: 14/568,333

(22) Filed: Dec. 12, 2014

(65) Prior Publication Data

US 2016/0172122 A1    Jun. 16, 2016

(51) Int. Cl.
| | |
|---|---|
| *H01G 11/32* | (2013.01) |
| *H01G 11/34* | (2013.01) |
| *H01G 11/42* | (2013.01) |
| *H01G 11/44* | (2013.01) |
| *C01B 32/336* | (2017.01) |

(52) U.S. Cl.
CPC .......... *H01G 11/32* (2013.01); *C01B 32/336* (2017.08); *H01G 11/34* (2013.01); *H01G 11/42* (2013.01); *H01G 11/44* (2013.01); *Y02E 60/13* (2013.01); *Y02T 10/7022* (2013.01)

(58) Field of Classification Search
CPC ........ H01G 11/32; H01G 11/52; H01G 11/86; H01G 9/00; H01G 9/15; H01G 11/30; H01G 11/22; H01G 11/38; H01G 8/10; H02G 11/62; H01M 8/04; H01M 4/96; H01M 4/90
See application file for complete search history.

(56) References Cited

U.S. PATENT DOCUMENTS

| | | |
|---|---|---|
| 5,985,486 A | 11/1999 | Giron |
| 6,316,563 B2 | 11/2001 | Naijo et al. |
| 6,395,367 B1 | 5/2002 | Michot et al. |
| 6,562,513 B1 | 5/2003 | Takeuchi et al. |
| 7,056,455 B2 | 6/2006 | Matyjaszewski et al. |
| 7,875,219 B2 | 1/2011 | Zhamu et al. |
| 2001/0011119 A1 | 8/2001 | Naijo et al. |
| 2002/0009635 A1 | 1/2002 | Michot et al. |
| 2002/0026021 A1 | 2/2002 | Armand et al. |
| 2002/0161146 A1 | 10/2002 | Naijo et al. |

(Continued)

FOREIGN PATENT DOCUMENTS

| | | |
|---|---|---|
| CN | 101807678 A | 8/2010 |
| CN | 102790233 A | 11/2012 |

(Continued)

OTHER PUBLICATIONS

Invitation Pay additional fee—PCT/US2015/064662 dated Apr. 1, 2016.

(Continued)

*Primary Examiner* — Nguyen Ha (74) *Attorney, Agent, or Firm* — Shantanu Pathak (57) ABSTRACT

An activated carbon composition having a relatively high transition metal content and a low covalent oxygen as defined herein. Also disclosed is a method of making and using the disclosed activated carbon composition, and an EDLC article incorporating the activated carbon composition.

11 Claims, 4 Drawing Sheets

(56) References Cited

U.S. PATENT DOCUMENTS

| | | |
|---|---|---|
| 2002/0193540 A1 | 12/2002 | Armand et al. |
| 2003/0185741 A1 | 10/2003 | Matyjaszewski et al. |
| 2004/0023092 A1 | 2/2004 | Armand et al. |
| 2005/0207962 A1 | 9/2005 | Dietz et al. |
| 2007/0172667 A1 | 7/2007 | Sato et al. |
| 2009/0092747 A1 | 4/2009 | Zhamu et al. |
| 2009/0130502 A1* | 5/2009 | Liu ............. H01M 4/9008 429/483 |
| 2010/0110613 A1 | 5/2010 | Zhong et al. |
| 2011/0182000 A1* | 7/2011 | Gadkaree .......... H01G 11/24 361/502 |
| 2012/0045688 A1 | 2/2012 | Liu et al. |
| 2012/0077080 A1 | 3/2012 | Liu et al. |
| 2012/0171574 A1 | 7/2012 | Zhamu et al. |
| 2012/0202033 A1* | 8/2012 | Chang ............ H01G 11/24 428/219 |
| 2012/0275988 A1* | 11/2012 | Fujii ............... C01B 31/12 423/460 |
| 2013/0059174 A1 | 3/2013 | Zhamu |
| 2013/0194721 A1 | 8/2013 | Cho |
| 2013/0209348 A1* | 8/2013 | Ludvik ............ C01B 31/10 423/460 |
| 2013/0211158 A1* | 8/2013 | Romanos .......... B01J 20/20 585/2 |
| 2014/0016246 A1 | 1/2014 | Gadkaree et al. |
| 2014/0098463 A1 | 4/2014 | Bendale et al. |
| 2014/0104754 A1* | 4/2014 | Lipka ............. C01B 31/08 361/502 |
| 2014/0177136 A1* | 6/2014 | Kim .............. H01G 11/34 361/502 |
| 2015/0050535 A1* | 2/2015 | Amiruddin ......... H01M 4/133 429/94 |
| 2015/0062778 A1* | 3/2015 | Gadkaree .......... H01G 11/26 361/502 |
| 2016/0104584 A1* | 4/2016 | Jiang ............. H01G 11/24 361/502 |
| 2016/0111227 A1* | 4/2016 | Asay .............. H01G 11/34 361/502 |

FOREIGN PATENT DOCUMENTS

| | | |
|---|---|---|
| CN | 103332677 A | 10/2013 |
| CN | 102481730 B | 12/2015 |
| EP | 1211702 | 6/2002 |
| JP | 2001229730 A | 8/2001 |
| JP | 2004067498 * | 3/2004 |
| JP | 2004067498 | 4/2004 |
| WO | 1999064156 A1 | 12/1999 |
| WO | 2008053919 | 5/2008 |
| WO | 2013142528 | 9/2013 |
| WO | 2013174536 A1 | 11/2013 |

OTHER PUBLICATIONS

AVX BestCap "Ultra-low ESR High Power Pulse Supercepacitors" Section 1: Electrical Ratings. p. 18-19 (2012) XP055108955.

International Search Report and Written Opinion PCT/US2015/064183 dated Aug. 5, 2016.

CN201580075883.5 First Office Action dated Jul. 3, 2018, China Patent Office.

* cited by examiner

ACTIVATED CARBON AND ELECTRIC DOUBLE LAYER CAPACITOR THEREOF

The entire disclosure of each publication or patent document mentioned herein is incorporated by reference.

BACKGROUND

The present disclosure relates generally to the field of electric double layer capacitor (EDLC), and a low cost activated carbon for EDLC applications.

SUMMARY

In embodiments, the disclosure provides:

an activated carbon composition having a relatively high transition metal content and a low covalent oxygen content;

a method of making activated carbon composition; and an EDLC article incorporating the activated carbon composition, which article is unexpectedly insensitive to the relatively high transition metal content.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Total transition metal content" or like terms refer, for example, to the atomic transition metal content in the activated carbon as metals or metal ions as measured by ICP, including Fe, Cu, Cr, Mn, and Ni.

"Total oxygen content" or like terms refer, for example, to the atomic oxygen content attributable to chemically bonded oxygen in the activated carbon as measured by ICP.

"Beginning of life," "BOL," or like presentations, refer to the beginning of life capacitance at life time equal to zero "Life test" refers to an industry standard involving testing the cell at 2.7 V at 65° C. and hold for 1500 hours. The inventive carbon was tested in a 2300 F cylindrical design EDLC device. The cell geometry of the EDLC device has an external diameter of 60.7 mm. The length including and excluding the terminal posts (used for welding into a cell pack assembly) are 108.4 mm and 96 mm, respectively. The length, width, and thickness dimensions of the electrode are 470 cm, 7.7 cm, and 226 microns, respectively. The electrode has 0.89 cm bare exposed aluminum on one side to enable welding of the electrodes to the terminals. The life test results are preferably independent of the cell geometry.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Energy storage devices such as ultracapacitors may be used in a variety of applications such as where a discrete power pulse is required. Exemplary applications range from cell phones to hybrid vehicles. Ultracapacitors have emerged as an alternative to batteries in applications that require high power, long shell life, long cycle life, or combinations thereof. Ultracapacitors typically comprise a porous separator and an organic electrolyte sandwiched between a pair of carbon-based electrodes. The energy storage is achieved by separating and storing electrical charges in the electrochemical double layers that are created at the interfaces between the electrodes and the electrolyte. Important characteristics of these devices are the energy density and power density that they can provide, which are both largely determined by the properties of the carbon that is incorporated into the electrodes.

Carbon-based electrodes suitable for incorporating into energy storage devices are known. Activated carbon is widely used as porous material in ultracapacitors due to its large surface area, electronic conductivity, ionic capacitance, chemical stability, low cost, or combinations thereof. Activated carbon can be made from natural precursor materials, such as coals, nut shells, and biomass, or synthetic materials such as phenolic resins. With both natural and synthetic precursors, the activated carbon can be formed by carbonizing the precursor and then activating the intermediate product. The activation can comprise physical (e.g., steam or $CO_2$) or chemical activation (e.g., KOH or $H_3PO_4$), or both, at elevated temperatures to increase the porosity and the surface area of the activated carbon.

Both physical and chemical activation processes typically involve large thermal budgets to heat and react the carbonized material with the activating agent. In the case of chemical activation, corrosive by-products can be formed when a carbonized material is heated and reacted with caustic chemical activating agents such as alkali metal hydroxides. Additionally, phase changes, or fluxing, may occur during the heating and reacting of the carbonized material and chemical activating agent, which can result in agglomeration of the mixture during processing. These drawbacks can add complexity and cost to the overall process, particularly for reactions that are carried out at elevated temperatures for extended periods of time.

WO 2013142528A1, entitled "Low ash activated carbon and methods of making same," mentions low ash activated carbons derived from a natural carbonaceous source material, and methods of making the same. In one embodiment, the method comprises carbonizing a carbonaceous source material to generate a char; activating said char to form an activated carbon; and washing said activated carbon with a plurality of increasingly basic solutions. The document also mentions that the activated carbon comprises copper, iron, nickel, and chloride, and wherein copper is present at less than 2.5 ppm, iron is present at less than 10 ppm, nickel is present at less than 1.5 ppm, and chloride is present at less than 35 ppm.

U.S. 20100110613, entitled "Ultracapacitor electrode with controlled iron content," mentions particles of active electrode material are made by blending or mixing a mixture of activated carbon, optional conductive carbon, and binder. In selected implementations, the iron level in the activated carbon and the resultant mixture is relatively low, for example, below 20 ppm.

Steam activation remains the most prevalent method of making activated carbon. The process is well established and has minimal safety issues. However, to avoid the foregoing issues and to reduce the cost of an EDLC device an inexpensive yet highly effective activated carbon is desired. It would be advantageous to manufacture a steam activated carbon using a low cost carbon precursor material. To date, activated carbon derived from low cost carbon precursors have been used in non-EDLC applications such as water filtration.

In embodiments, the present disclosure provides a method of making a low-cost activated carbon comprising: selecting a low-cost carbon source; cleaning activated carbon derived from a low-cost carbon source; and heat treating the resultant carbon to yield an activated carbon suitable for use in an EDLC article.

In embodiments, a low cost steam activated carbon having a D50 particle size of 280 microns, and having a high level of impurities was prepared or selected (see Table 1 for a listing of the impurity levels in the steam activated carbon). The steam activated carbon was first rinsed in de-ionized water, washed in 10 wt % aqueous HCl, followed by rinsing in de-ionized water. The rinsing and washing sequence was repeated a second time to reduce the impurities content, especially the Fe content to around 80 ppm. The resultant wet cake was heat treated at 900° C. for 2 hrs in forming gas (1 vol % $H_2$, in $N_2$). This high temperature heat treatment in the reducing atmosphere decreased the bound oxygen content of activated carbon to around 0.5 wt %. The activated carbon was ground to a D50 of about 5 microns. The resultant activated carbon was processed into electrodes and packaged to form an EDLC device with 1M tetraethylammonium tetrafluoroborate (TEA-TFB) electrolyte salt in acetonitrile solvent. The beginning of life capacitance (BOL) of the device is 65.2 F/cc. The normalized capacitance of the EDLC device after 1500 hours of 2.7 V at 65° C. stress test was 85%, with almost no change in equivalent series resistance (ESR). This performance can be attributed to a low concentration of molecularly bonded oxygen in the carbon. This performance also demonstrated the robustness of the material towards higher levels of transition metal impurities.

In embodiments, the disclosed activated carbon when assembled into an EDLC device exhibits capacitance and aging characteristics comparable to the state-of-the-art activated carbons. The prior art uses a carbon having a lower content of transitional metals but having a higher bonded oxygen content. The presently disclosed activated carbon can be prepared from a low cost raw material precursor that contains higher levels of transitional metal impurities. A high temperature heat treatment step can be employed to reduce the level of oxygen in the activated carbon.

In embodiments, the present disclosure provides a low-cost activated carbon for use in, for example, EDLC articles.

In embodiments, the present disclose provides a low-cost activated carbon having a high transition metal content, and low oxygen content. The disclosed activated carbon composition having a high transition metal content unexpectedly provided an EDLC article having satisfactory performance and avoided the need for and the expense of reducing or removing the high transition metal content. A high temperature heat treatment accomplished during the carbon activation method provided a reduction in molecularly bonded oxygen and oxygen containing surface functional groups on the surface of the carbon. The reduction in oxygen provided a reduction in faradaic reactions in the EDLC device. Conventional EDLC knowledge teaches that a lower transitional metal impurity content is necessary for a suitable EDLC activated carbon (see for example, the above mentioned U.S. Patent Publication 20100110613, where it is preferred to have the iron content in the activated carbon of less than 20 ppm).

Applicant has unexpectedly discovered that a lower oxygen content in the activated carbon is a significant factor in EDLC performance, and that an activated carbon made from an inexpensive carbon source containing a higher level of transition metal impurities can be satisfactorily used if the oxygen content is reduced to about 0.7 wt % or less.

The use of an activated carbon having high transition metal impurities permits the use of wide range of inexpensive carbon source materials from different regions of the world, and decreases the final cost of activated carbon.

The use of the disclosed an activated carbon having high transition metal impurities and a low or reduced oxygen content provide an EDLC article having comparable performance to an activated carbon having a low transition metal impurities and high oxygen content.

In embodiment, the disclosure provides a physically (e.g., steam, $CO_2$, or combinations thereof), activated carbon composition, comprising:

a chemically bonded oxygen content of from 0.05 to 0.7 wt %, such as 0.05 to 0.20 wt %; and a total transition metal content of from 70 to 300 ppm.

In embodiment, the total transition metal content is from 70 to 200 ppm.

In embodiment, the total oxygen content is from 0.05 to 0.4 wt %.

In embodiment, the total transition metal content can be, for example, from 70 to 200 ppm, and the total oxygen content can be, for example, from 0.05 to 0.4 wt %.

In embodiment, the total transition metal content can be, for example: Fe of from 60 to 90 ppm; Cu of from 50 to 70 ppm; Cr of from 1 to 5 ppm; Mn of from 1 to 5 ppm; and Ni of from 1 to 5 ppm. In embodiments, the total transition metal content can be, for example: Fe of from 80 to 85 ppm; Cu of from 60 to 65 ppm; Cr of from 1 to 5 ppm; Mn of from 1 to 5 ppm; and Ni of from 1 to 5 ppm.

In embodiment, the physically activated carbon can have, for example, a total pore volume of from 0.40 to 0.55 cm$^3$/g; and a surface area of from 1350 to 1600 m$^2$/g.

In embodiment, the disclosure provides an EDLC article, comprising, for example:

at least one electrode comprising the abovementioned activated carbon composition.

In embodiment, the article when evaluated in a 2.7V and 65° C. stress test at 1500 hours had:

a normalized capacitance of at least 80%;

a normalized ESR that was unchanged (e.g., constant) over the life of the test; and a beginning of life (BOL) capacitance of from 60 to 70 F/cc.

In embodiment, the normalized capacitance in a 2.7V and 65° C. stress test at 1500 hours can be, for example, 80 to 90%.

In embodiment, the normalized capacitance in a 2.7V and 65° C. stress test at 1500 hours can be, for example, 85%.

In embodiment, the normalized capacitance in a 2.7V and 65° C. stress test at 1900 hours can be, for example, 85%.

In embodiment, the energy density and power density of the article is insensitive to the total transition metal content of the activated carbon.

In embodiment, the disclosure provides a method of making the abovementioned activated carbon composition, comprising:

coarse grinding a char from a low-cost carbon source to a D50 of from 0.1 to 3 mm (e.g., about 0.28 mm);

steam activating the coarse grind char to form an activated carbon;

acid washing the steam activated carbon; and heating the acid washed steam activated carbon at from 850 to 950° C. in a reducing atmosphere.

In embodiment, an activated carbon composition, as disclosed herein, can be obtained commercially, and further treated in accordance with the disclosure In embodiments, the method of making can further comprise pyrolyzing a low-cost carbon source at from about 30 mins to 4 hrs and 400 to 900° C.

In embodiments, the low-cost carbon source can be, for example, a coconut shell. In embodiments, the low-cost carbon source can cost, for example, from $2 to 3 U.S. per kilogram.

Figure 1:
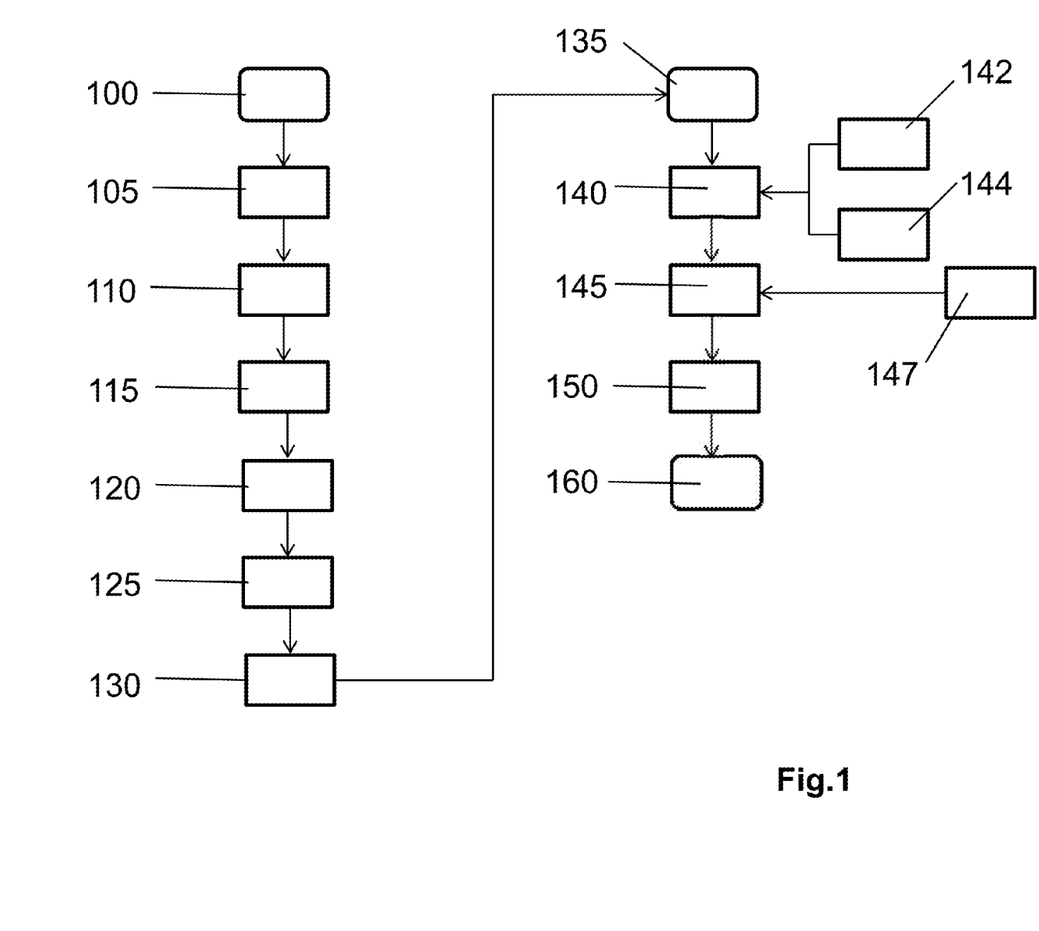
FIG. 1 shows a flow chart for the method of making the disclosed high transition metal content, low oxygen content, activated carbon, and an EDLC article containing the activated carbon.

Referring to the figures, FIG. 1 shows a flow chart for a representative manufacture of the disclosed activated carbon and an EDLC article containing the disclosed activated carbon. The carbon source starting material is a low cost coconut shell that is similar to the carbon source used to make activated carbon, for example, for water filtration. The coconut shell carbon source starting material (100) is pyrolyzed (105) to obtain a char material. A conventional pit furnace or a more controlled green reactor can be used to convert the coconut shell into char under an inert atmosphere. The particle size of the char is then downsized to a D50 of about 280 microns using any suitable grinding apparatus and techniques such as coarse grinding (110) (jaw crushing/BICO pulverizing), or final grinding (130) with a ball mill, a jet mill, a pin mill, a fluidized mill, and like equipment. The steam activation (115) process includes heating the furnace in $N_2$ containing atmosphere from room temperature to activation temperature (e.g., 700 to 950° C.) for pre-determined activation time (e.g., 1 to 4 hrs). The activation hold time and temperature conditions depend on, for example, the batch size, reactor type, and steam flow. Such activated carbons are produced by several manufacturers (e.g., Haycarb, Jacobi, United Carbon Solutions, etc.) worldwide and are typically used for water filtration. Next are washing steps (double acid washing) (120) to remove metal contaminants. In a first washing step, the carbon material was first combined with 1980 mL of de-ionized water and then 990 mL of 10 wt % aqueous HCl. The mixture was stirred and heated on a hot plate at from 90 to 100° C. for 60 minutes, then the solid material was separated from the liquid by vacuum assisted filtration. For a double wash, the above procedure was repeated one more time. A high temperature heat treatment (125) was accomplished in a forming gas atmosphere at 900° C. to reduce the oxygen containing functional groups on carbon surface, which improves the carbon's long term durability in an EDLC article. The activated carbon was placed in SiC crucibles and loaded into, for example, a box furnace. Other furnace types such as a rotary furnace can alternatively be used. The furnace temperature was increased at a heating rate of 150° C. per hour to about 900° C., maintained at temperature for 2 hrs, and then allowed to cool naturally. During this heating/cooling cycle, the furnace was constantly purged with $N_2$ or a $N_2/H_2$ mixture. After the heat treatment the carbon was finely ground (130) to a final desired particle size having a D50 of about 5 microns to provide the high transition metal content, low oxygen content, activated carbon (135).

Further Formulation and Fibrillation (140) A carbon electrode layer was prepared by mixing 85 wt % of the activated carbon (135), 5 wt % of a carbon black (144), and 10 wt % of PTFE binder (142) (DuPont 601A). The mixture was initially combined using a Henschel high speed mixer and then the PTFE was fibrillated using a ball mill, jet mill, or twin screw extruder.

Calendaring and Lamination (145) The fibrillated mixture of activated carbon, PTFE, and carbon black, was calendared to form a carbon paper. The typical sheet thickness was about 100 microns. Carbon-based electrodes were made by laminating activated carbon-containing paper sheets onto a conductive ink coated aluminum foil (25 micron thick) (147).

Packing, Drying, and Electrolyte Filling (150) The carbon-based electrodes and a paper (cellulose) separator, were wound into jelly rolls, and then packaged in an aluminum can. The EDLC article was vacuum dried (130° C. for 48 hrs at less than 0.05 Torr), and filled with electrolyte (1M TEA-TFB in acetonitrile solvent) to form the EDLC article (160).

EDLC Device form factor. The inventive carbon was tested in a 2300 F cylindrical design EDLC device. The external diameter of the cylindrical device was 60.7 mm. The length including and excluding the terminal posts (used for welding into a cell pack assembly) are 108.4 mm and 96 mm, respectively. The length, width, and thickness dimensions of the electrode are 470 cm, 7.7 cm, and 226 microns, respectively. The electrode has 0.89 cm bare exposed aluminum on one side to enable welding of the electrodes to the terminals.

Specific Power and Specific Energy of EDLC Device with Inventive Carbon. The specific power and specific energy are represented by the equations:

$$P_{max} = \frac{V^2}{4 \times ESR_{DC} \times \text{mass}}$$

$$E_{max} = \frac{\frac{1}{2}CV^2}{3600 \times \text{mass}}$$

where C is capacitance, V is voltage, and ESR is equivalent series resistance. The capacitance (C) of the device was 2266 F and the ESR was 0.45 milliohms. The weight of the cell was 401 g. The Pmax and Emax were calculated to be 10,100 W/kg and 5.72 Wh/kg, respectively.

EXAMPLES

The following Examples demonstrate making, use, and analysis of the disclosed activated carbon, the EDLC article, and methods in accordance with the above general description.

Comparative Example 1

Figure 2:
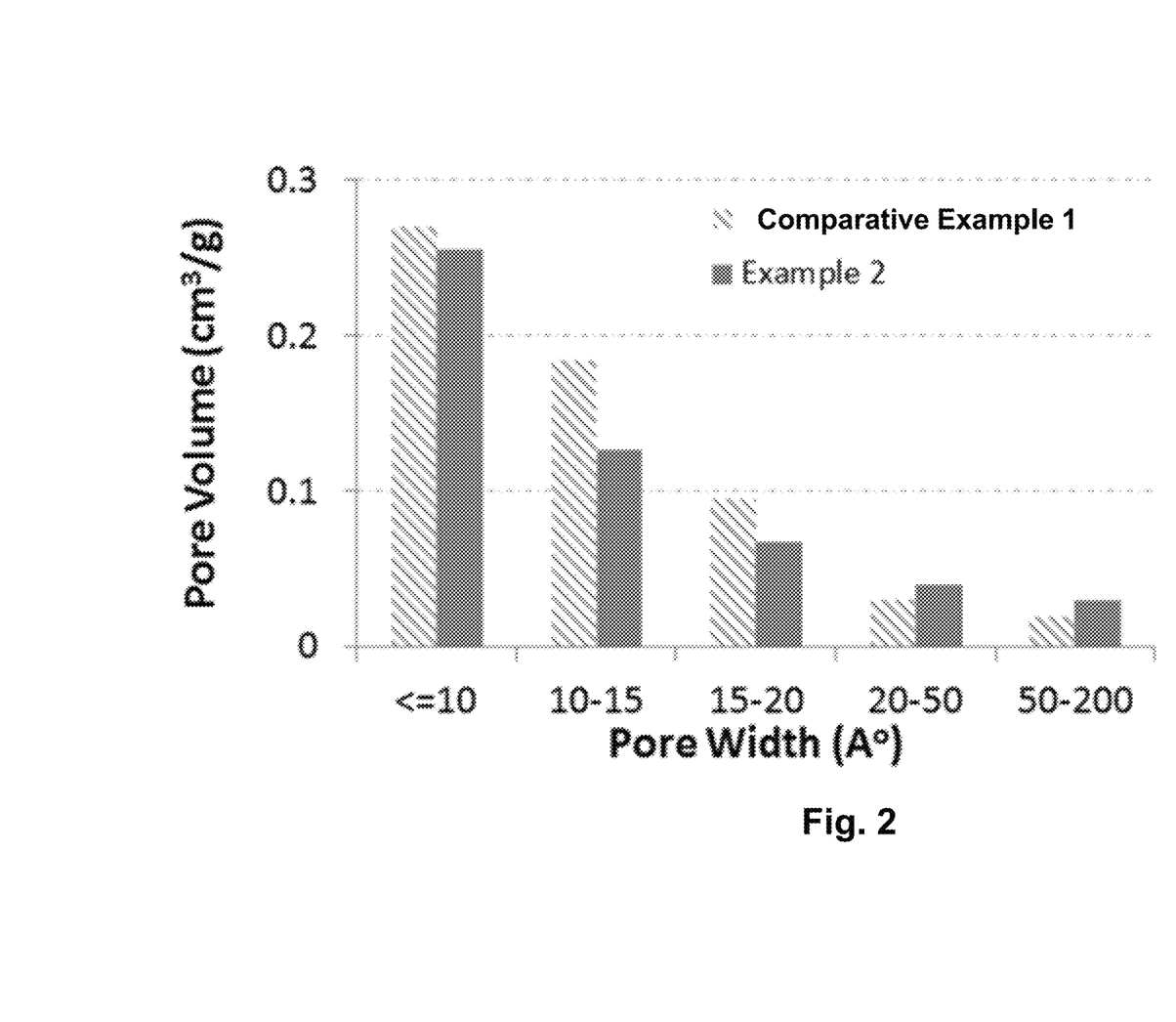
FIG. 2 shows the pore size or pore width distribution for a comparative activated carbon and the inventive activated carbon.
Figure 3:
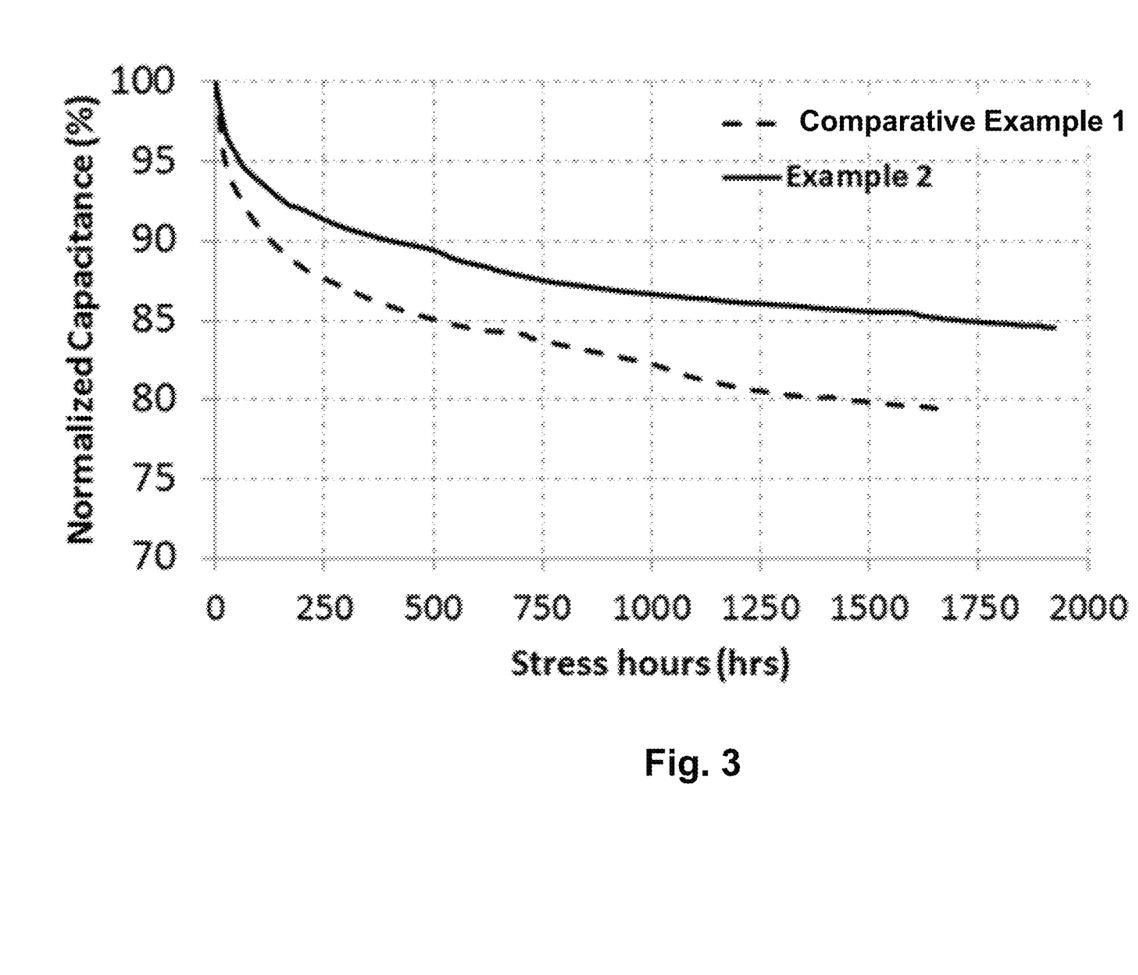
FIG. 3 shows the normalized capacitance for the comparative activated carbon of Comparative Example 1 (dashed line) and inventive carbon of Example 2 (solid line) during a stress test at 2.7 V and 65° C.
Figure 4:
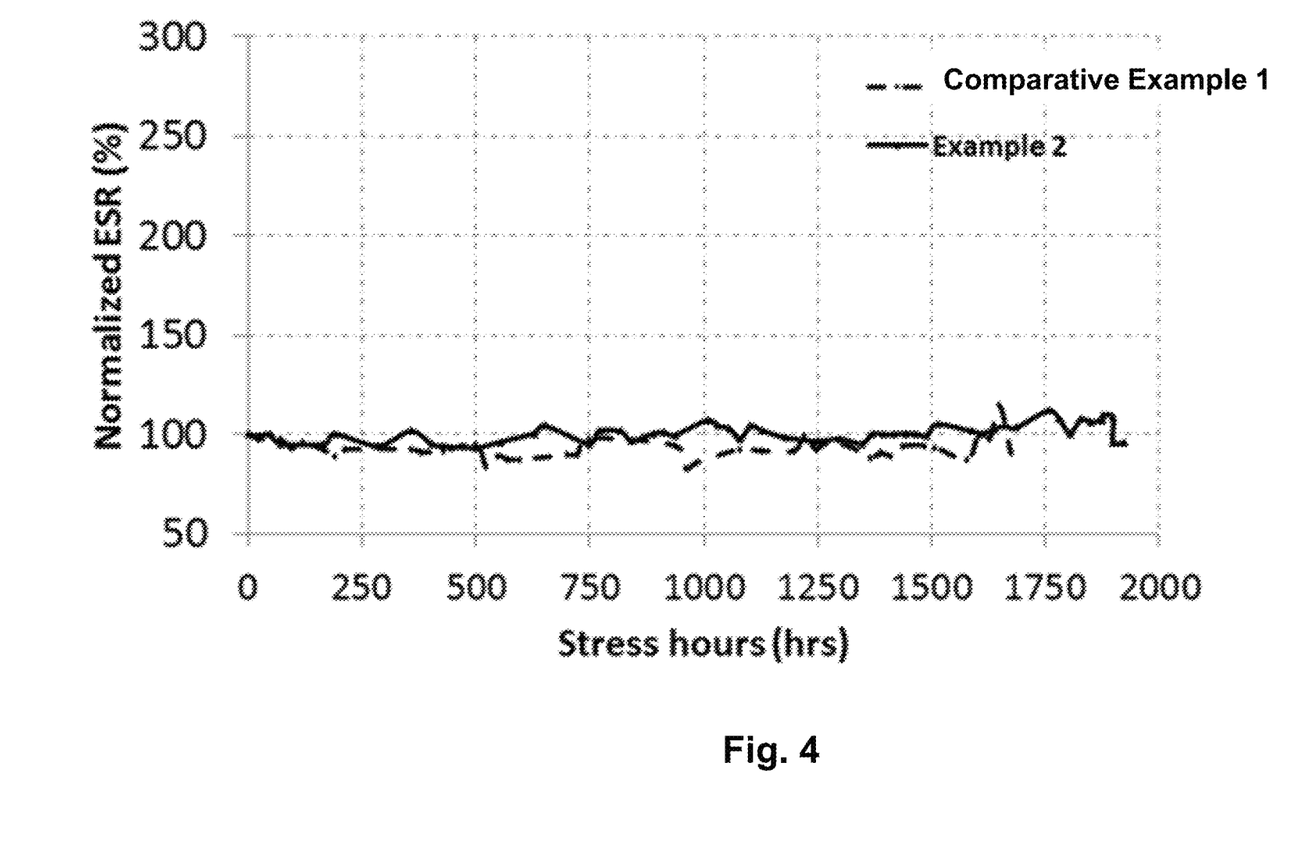
FIG. 4 shows the normalized equivalent series resistance (ESR) for the comparative activated carbon of Comparative Example 1 (dashed line) and inventive carbon of Example 2 (solid line) during a stress test at 2.7 V and 65° C.

YP50 Carbon A commercial Kuraray steam activated carbon (YP50) (presumably acid washed) assembled into electrodes was used as a comparative example. The oxygen content of the as-received YP50 was 1.37 wt %. The ICP analysis of this carbon showed the Fe content to be about 16 ppm. Other impurities included: Cr, 1 ppm; Cu, 28 ppm; Mn, 1 ppm; and Ni, 1 ppm (see Table 1). The pore size distribution of this carbon is shown in FIG. 2. The total pore volume was 0.60 cm³/g, with 0.27 cm³/g pore volume in pores less than 10 Angstroms in diameter. These electrodes were assembled into an EDLC device (with electrolyte: 1 M TEA-TFB in acetonitrile solvent) and tested at 2.7 V and 65° C. The beginning of life (BOL) capacitance of the carbon was 64.9 F/cc, and the normalized % capacitance at end of 1500 hrs of testing was about 79.8% with limited increase in the ESR during the life test (FIG. 3). The capacitor industry criteria for normalized capacitance is higher than 80%, and normalized ESR is 200% at 1500 hrs of voltage stress test. Consequently, this carbon barely passed the normalized capacitance target.

Example 2

Inventive Activated Carbon A carbon obtained from Superior Absorbents, Inc. (SAI) of Emlenton, Pa., made from a low cost coconut carbon source and having a BET surface area of 1500 m²/g and particle size of 280 microns, was selected as the starting steam activated carbon. The ICP analysis of the as received commercial carbon showed high levels of impurities, especially Fe at 260 ppm. This carbon was washed using the above mentioned double acid wash procedure. The resultant carbon was heat treated at 900° C. in 1% $H_2/N_2$ for 2 hrs to reduce the covalently bonded oxygen surface functional groups. The carbon was then ground in a 4" micronizer jet mill to a D50 particle size of about 5 microns to yield the transition metal insensitive activated carbon. The ICP analysis of this carbon showed Fe content was about 81 ppm. Other impurities included: Cr, 2 ppm; Cu, 64 ppm; Mn, 1.4 ppm; and Ni, 3.4 ppm (see Table 1). The oxygen content of the resultant carbon was 0.18 wt %. The total pore volume by the density functional theory (DFT) method was 0.52 cm³/g, with 0.26 cm³/g of the pore volume in pores less than 10 Angstroms in diameter.

Pore Size Distribution of Inventive Carbon. The inventive carbon was characterized by the BET method to have a surface area of, for example, 1409 m²/g, and a DFT method total pore volume of 0.49 cm³/g. Of this total pore volume, 0.26 cm³/g pore volume is in pores less than 1 nm range, 0.19 cm³/g pore volume in pores between 1 nm and 2 nm, and 0.04 cm³/g pore volume in pores greater than 2 nm.

The activated carbon was mixed with PTFE and carbon black, and processed into electrodes using the above procedure. These electrodes were then assembled into an EDLC article (with electrolyte: 1 M TEA-TFB electrolyte in acetonitrile solvent) and tested at 2.7 V and 65° C. for 1500 hrs. The beginning of life capacitance of the carbon was 65.2 F/cc, and the normalized capacitance at end of 1500 hrs of test was about 85.5% with limited increase in the ESR during the life test (FIG. 3). The industry criteria for normalized capacitance is higher than 80%, and normalized ESR is 200% at 1500 hrs of voltage stress test. Additionally, this inventive carbon achieved 2000 hrs with normalized capacitance of 84.5% with little change in ESR.

The disclosure has been described with reference to various specific embodiments and techniques. However, it should be understood that many variations and modifications are possible while remaining within the scope of the disclosure.

What is claimed is:

1. An activated carbon composition, comprising:
   a chemically bonded oxygen content of from 0.05 to 0.7 wt %; and

TABLE 1

Oxygen content and impurities for comparative and inventive carbons.

| Example | Oxygen (wt %) | Cr ppm | Cu ppm | Fe ppm | Mn ppm | Ni ppm | BOL Capacitance (F/cc) | Normalized Capacitance at 1500 hours (%) | Normalized ESR at 1500 hours (%) |
|---|---|---|---|---|---|---|---|---|---|
| Comparative 1 | 1.37 | 1 | 28 | 16 | 1 | 1 | 64.9 | 79.8 | No change |
| Inventive 2 | 0.18 | 2 | 64 | 81 | 1.4 | 3.4 | 65.2 | 85.5 | No change | a total transition metal content of from 70 to 300 ppm, wherein the total transition metal content comprises: Fe of from 60 to 90 ppm; Cu of from 50 to 70 ppm; Cr of from 1 to 5 ppm; Mn of from 1 to 5 ppm; and Ni of from 1 to 5 ppm.

2. The composition of claim 1 wherein the total transition metal content is from 70 to 200 ppm.

3. The composition of claim 1 wherein the total oxygen content is from 0.05 to 0.4 wt %.

4. The composition of claim 1 wherein the total transition metal content is from 70 to 200 ppm, and the total oxygen content is from 0.05 to 0.4 wt %.

5. The composition of claim 1 wherein the physically activated carbon has a total pore volume of from 0.40 to 0.55 cm$^3$/g; and a surface area of from 1350 to 1600 m$^2$/g.

6. An EDLC article, comprising:
at least one electrode comprising the activated carbon composition of claim 1.

7. The article of claim 6 wherein in a 2.7V and 65° C. stress test at 1500 hours:
the normalized capacitance of the article is at least 80%;
the normalized ESR of the article is unchanged; and
the beginning of life (BOL) capacitance of the article is from 60 to 70 F/cc.

8. The article of claim 6 wherein the normalized capacitance is 80 to 90%.

9. The article of claim 6 wherein the normalized capacitance is 85%.

10. The article of claim 6 wherein the normalized capacitance at 1900 hours is 85%.

11. The article of claim 6 wherein the energy density and power density of the article is insensitive to the total transition metal content of the activated carbon.

* * * * *

UNITED STATES PATENT AND TRADEMARK OFFICE
CERTIFICATE OF CORRECTION

PATENT NO. : 10,068,715 B2
APPLICATION NO. : 14/568333
DATED : September 4, 2018
INVENTOR(S) : Atul Kumar et al.

It is certified that error appears in the above-identified patent and that said Letters Patent is hereby corrected as shown below:

On the Title Page

On page 2, Column 2, item (56), other publications, Line 1, delete "Supercepacitors"" and insert -- Supercapacitors" --, therefor.

Signed and Sealed this
Twenty-sixth Day of April, 2022

Katherine Kelly Vidal
*Director of the United States Patent and Trademark Office*